United States Patent [19]

DeLuca et al.

[11] Patent Number: 5,212,721

[45] Date of Patent: May 18, 1993

[54] TELEPHONE DIALING PAGING APPARATUS METHOD

[75] Inventors: Michael J. DeLuca; Robert D. Lloyd, both of Boca Raton, Fla.

[73] Assignee: Motorola, Inc., Schaumburg, Ill.

[21] Appl. No.: 395,613

[22] Filed: Aug. 18, 1989

[51] Int. Cl.⁵ .............................................. H04Q 7/00
[52] U.S. Cl. ..................................... 379/57; 379/354; 379/355
[58] Field of Search ............... 379/57, 56, 354, 355, 379/356, 210, 211, 212, 201; 340/825.44, 825.52

[56] References Cited

U.S. PATENT DOCUMENTS

| | | |
|---|---|---|
| 4,071,697 | 1/1978 | Bushnell et al. |
| 4,490,579 | 12/1984 | Godoshian ............................. 379/57 |
| 4,747,122 | 5/1988 | Bhagat et al. ......................... 379/57 |
| 4,757,267 | 7/1988 | Riskin .................................. 379/201 |
| 4,847,886 | 7/1989 | Chumley ............................... 379/56 |
| 4,851,829 | 7/1989 | DeLuca et al. ..................... 340/825.44 |
| 4,885,762 | 12/1989 | Suzuki et al. ....................... 379/355 |
| 4,951,043 | 8/1990 | Minami ............................. 340/825.44 |

*Primary Examiner*—James L. Dwyer
*Attorney, Agent, or Firm*—Daniel R. Collopy; William E. Koch; Thomas G. Berry

[57] ABSTRACT

A tone only pager including an EEPROM with telephone numbers stored therein at different predetermined addresses and a DTMF signal generator. If a received signal includes one of the predetermined addresses, a DTMF telephone number corresponding to the address is generated. If a received signal also includes a different telephone number, any telephone number stored at that predetermined address may be replaced with the different telephone number. The pager also determines if the telephone number is a long distance telephone number and activates an indicator in response thereto.

18 Claims, 3 Drawing Sheets

TELEPHONE DIALING PAGING APPARATUS METHOD

The present invention pertains to paging receivers and methods of using the same, and more specifically to multinumber tone only paging functions and methods of using the same.

BACKGROUND OF THE INVENTION

Currently, the alert from a tone only pager indicates that a user is to dial a single telephone number. The user must remember this telephone number and the telephone number cannot be changed. In order to call different or variable telephone numbers a user must purchase a display pager, which is more expensive than a tone only pager. With a display pager, a received telephone number is shown on the display of the pager and the user then reads and manually dials the telephone number.

Display pagers with DTMF dialing abilities have been described in U.S. Pat. No. 4,490,579 to Godoshian, but such display pagers are complicated and expensive. Further, the phone number to be called can only be transmitted by the paging terminal to the pager, which then displays the telephone number to be called. The user must then select from the display, the telephone number to be dialed. Thus, additional transmission time is required to transmit the complete telephone number and a display is required in order for the user to read the telephone number. When considering that a typical pager user only dials a few predetermined telephone numbers, both the process of communicating telephone numbers and the pager which dials the telephone numbers may be greatly simplified.

Additionally, display pagers present a distinct disadvantage to the pager user with impaired vision. Dialing a telephone number displayed by a pager is virtually impossible for an unsighted person. Thus it is desirable to provide a pager which receives paging messages and dials corresponding telephone numbers without the necessity of a display.

SUMMARY OF THE INVENTION

It is an object of the present invention to provide a new and improved tone only function for a pager.

It is a further object of the present invention to provide a new and improved tone only function for a pager which is capable of dialing a variety of telephone numbers.

It is a further object of the present invention to provide a new and improved tone only function for a pager which is capable of changing phone numbers stored therein by a call from the paging terminal.

It is a further object of the present invention to provide a new and improved pager which is much more convenient and less expensive than prior art pagers.

These and other objects are realized in a tone only function for a pager including a memory for storing a plurality of telephone numbers each at a predetermined address therein, a controller for receiving a telephone number from the memory in response to one of the predetermined addresses being supplied thereto, a receiver for receiving signals including one of the predetermined addresses transmitted by a remote transmitter, an address decoder for decoding the predetermined addresses in the received signals and supplying the decoded addresses to the controller, and a DTMF generator coupled to receive telephone number signals from the controller and convert them into audible DTMF signals for automatic dialing.

These and other objects are further realized in a pager including an erasable memory and methods of operation wherein the telephone numbers stored at predetermined addresses can be changed by a message from the paging terminal and the pager activates an indicator if the new telephone number is a long distance call.

BRIEF DESCRIPTION OF THE DRAWINGS

Referring to the drawings.

DESCRIPTION OF THE PREFERRED EMBODIMENTS

Figure 1:
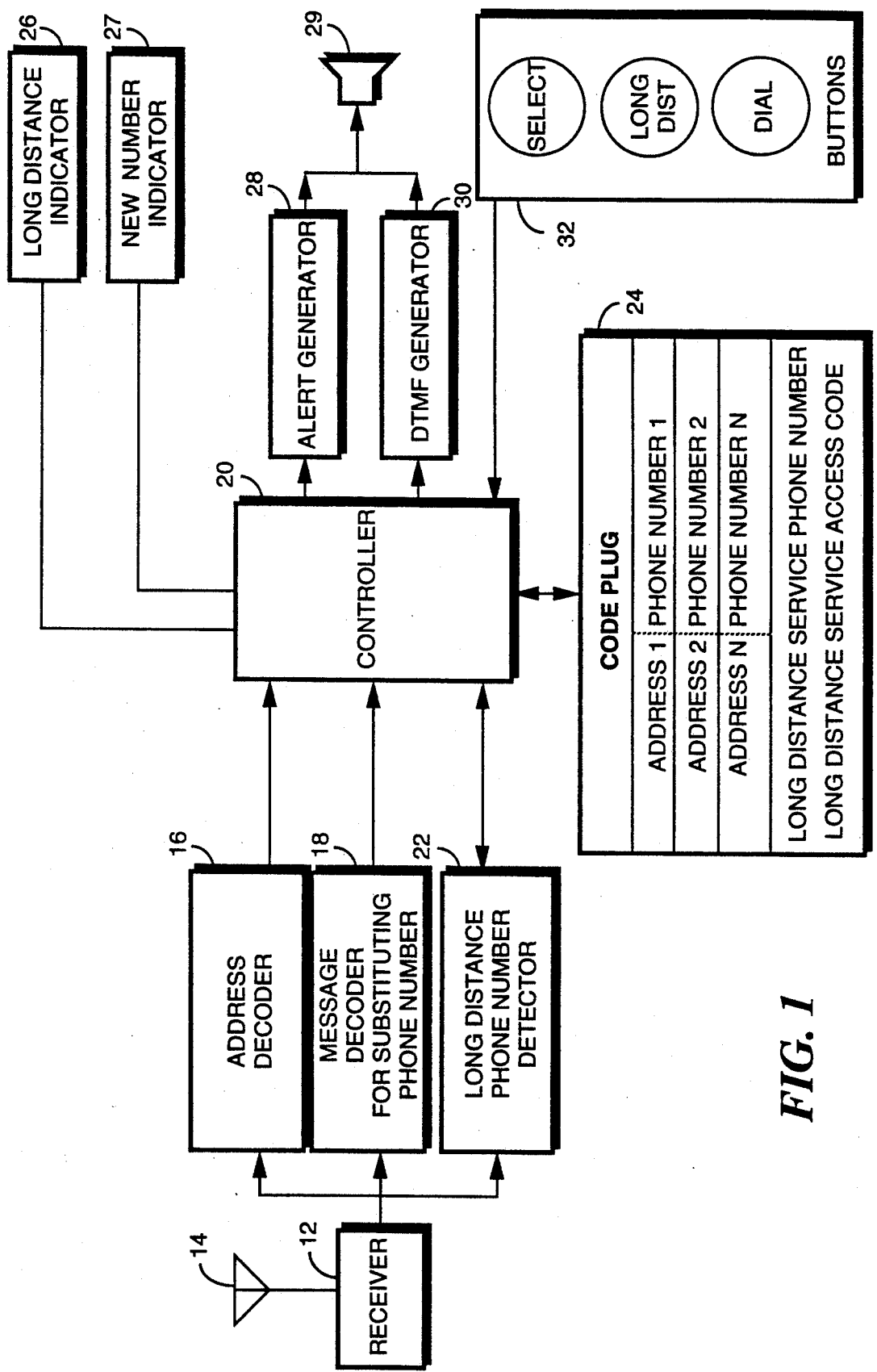
FIG. 1 is a simplified block diagram of a tone only pager embodying the present invention.

Referring specifically to FIG. 1, a simplified block diagram of a pager embodying the present invention is illustrated. The pager includes a receiver 12 having an antenna 14 operatively attached thereto for receiving paging signals from a remote paging terminal (not shown). Receiver 12 processes the received paging signals in a well known manner and couples only messages properly addressed to the pager to an address decoder 16 and a message decoder 18. Address decoder 16 is connected to a controller 20, which may be, for example, a microprocessor or the like, for supplying decoded addresses thereto. A preferred microcomputer is the Motorola MC146805H2 microcomputer which may control the functions of a pager as shown in U.S. Pat. No. 4,851,829 to DeLuca et al. Said patent is hereby incorporated by reference. Message decoder 18 is also connected to controller 20 for supplying thereto any telephone numbers that may be included in the received signal. Message decoder 18 also supplies telephone numbers to a long distance telephone number detector 22, which is also connected to controller 20.

Controller 20 is operatively connected to a memory 24 having the capability of storing a plurality of telephone numbers corresponding to a plurality of predetermined addresses. Memory 24 may be for example a RAM, a ROM, a PROM, an EEPROM, or other erasable electrically programmable memory. Each of these different types of memories exhibit well known and different advantages and any may be selected dependent upon the application. A long distance telephone number indicator 26, in one embodiment is an audio tone generator sounding a tone of a first predetermined frequency, while in another embodiment is a light emitting diode. Indicator 26 is connected to controller 20 and is activated when a long distance call is to be dialed. A new telephone number indicator 27 in one embodiment is an audio tone generator sounding a tone of a second predetermined frequency, while in another embodiment is a light emitting diode. Indicator 27 is connected to controller 20 and is activated when a new telephone number decoded by decoder 18 is to be dialed, thereby providing the user with an indication of the new telephone number. The tone embodiment of indicators 26 and 27 provide indicators for the vision impaired. An alert generator 28 is connected to controller 20 and provides a paging alert by way of a speaker 29 in a fashion well known to those skilled in the art. A DTMF generator 30, is connected to controller 20 and speaker 29 and generates audible dialing tones, in response to control signals from controller 20, which may be used to automatically dial a telephone number selected in response to a page. To use the audible dialing tones, speaker 29 is placed near to the transmitter (mouth piece) of a push button telephone and the generated dial tones dial the correct number, instead of manually pushing the dialing buttons. Alternately the DTMF generator may be electrically coupled to the telephone network thereby eliminating the need to produce audio tones to be received by the microphone of the telephone. The electronic coupling may including a coupling to a stationary, mobile, or portable cellular or CT2 telephone. Furthermore, the electrical coupling would provide for alternate dialing methods such as the well known pulse dialing method. A control panel 32 contains three buttons, labelled "SELECT", "LONG DIST" and "DIAL", which are used by the pager operator to control the pager. Each of the three buttons is connected to controller 20.

Memory 24 has storage room for N telephone numbers corresponding to N predetermined addresses. Additional telephone numbers, such as long distance service telephone numbers and access or credit card numbers, may also be stored if automatic dialing rather than manual dialing is preferred. When a specific address is coupled to controller 20 by address decoder 16, controller 20 accesses the specific telephone number in memory 24 corresponding to the address. Additionally, a unique alert sequence indicative of the address is generated and annunciated on speaker 29, thereby indicating to the user which telephone number will be dialed. The telephone number is then used by controller 20 to control DTMF generator 30 to produce the correct audible dial tones for dialing that specific telephone number. The specific memory and size of memory supplied in a pager or paging system will depend upon the specific needs of the user or the users in the system. In its simplest form, all telephone numbers to be used will be prestored in the memory and components 18, 22 and 26 will not be included in the pager.

In a different embodiment, components 18, 22 and 26 are included for changing at least one telephone number stored in memory 24. In conjunction with this different embodiment, a typical signal transmitted by a paging terminal contains the proper address for a selected pager and a new telephone number corresponding to the address. In this embodiment, if message decoder 18 senses a new telephone number in the signal from the paging terminal, the new telephone number is coupled to controller 20. Controller 20 first stores the new telephone number in memory 24 corresponding to the address. Next, controller 20 uses the new telephone number to control DTMF generator 30 to produce the correct audible dial tones for dialing the new telephone number. If the new telephone number is a long distance number, long distance phone number detector 22 (which may for example sense the number of digits in the number or may sense a special tag added by the paging terminal) signals controller 20 and controller 20 activates indicator 26.

Figure 2:
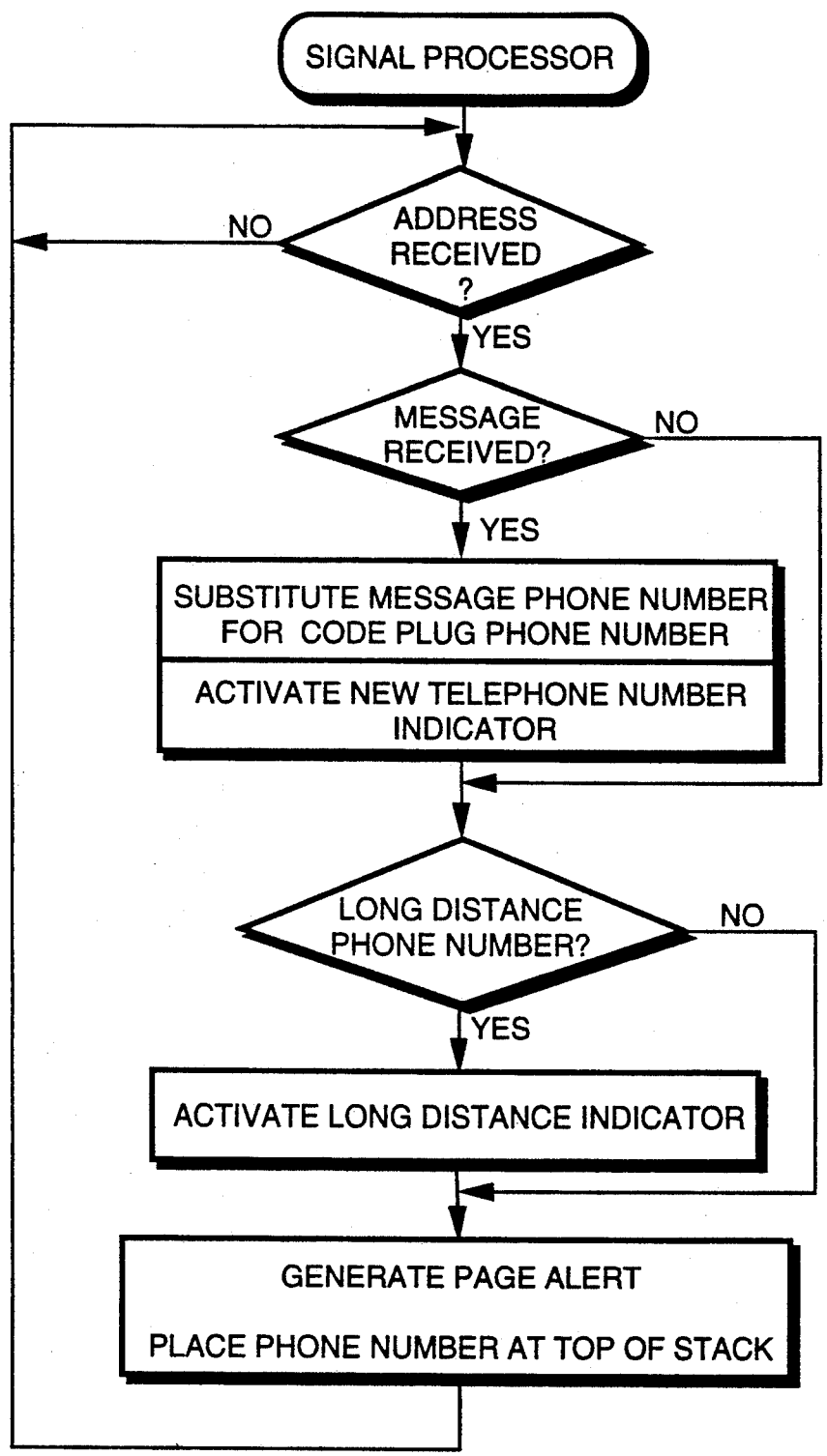
FIG. 2 is a flow chart illustrating the signal reception processes for the pager of FIG. 1.

Referring specifically to FIG. 2, the process steps performed by controller 20 are illustrated in the form of a flow chart. As a basic or first step, whenever pager 10 is active controller 20 looks for an address from address decoder 16. When an address providing for a new telephone number is received, controller 20 looks for a message (telephone number) from message decoder 18. If a message is received with a new telephone number, the new telephone number is stored in memory 24 and the new address indicator 27 is illuminated. If an old number is already stored, the new number simply replaces the old number. After storing the new number, or if no message is received, or if an address not providing for a new telephone number is received, controller 20 checks long distance phone detector 22 to determine if the number is a long distance telephone number. If true, controller 20 activates indicator 26. After activating indicator 26, or if the new number is not a long distance telephone number, controller 20 activates page alert generator 28 and places the number to be called at the top of a temporary memory stack (contained within controller 20). In an alternate embodiment, the new number may only be placed on the stack thereby keeping the old number in the codeplug memory for permanent use. Controller 20 then goes on to look for new addresses from address decoder 16 and the number stored in the temporary memory stack remains there until requested by the operator.

Figure 3:
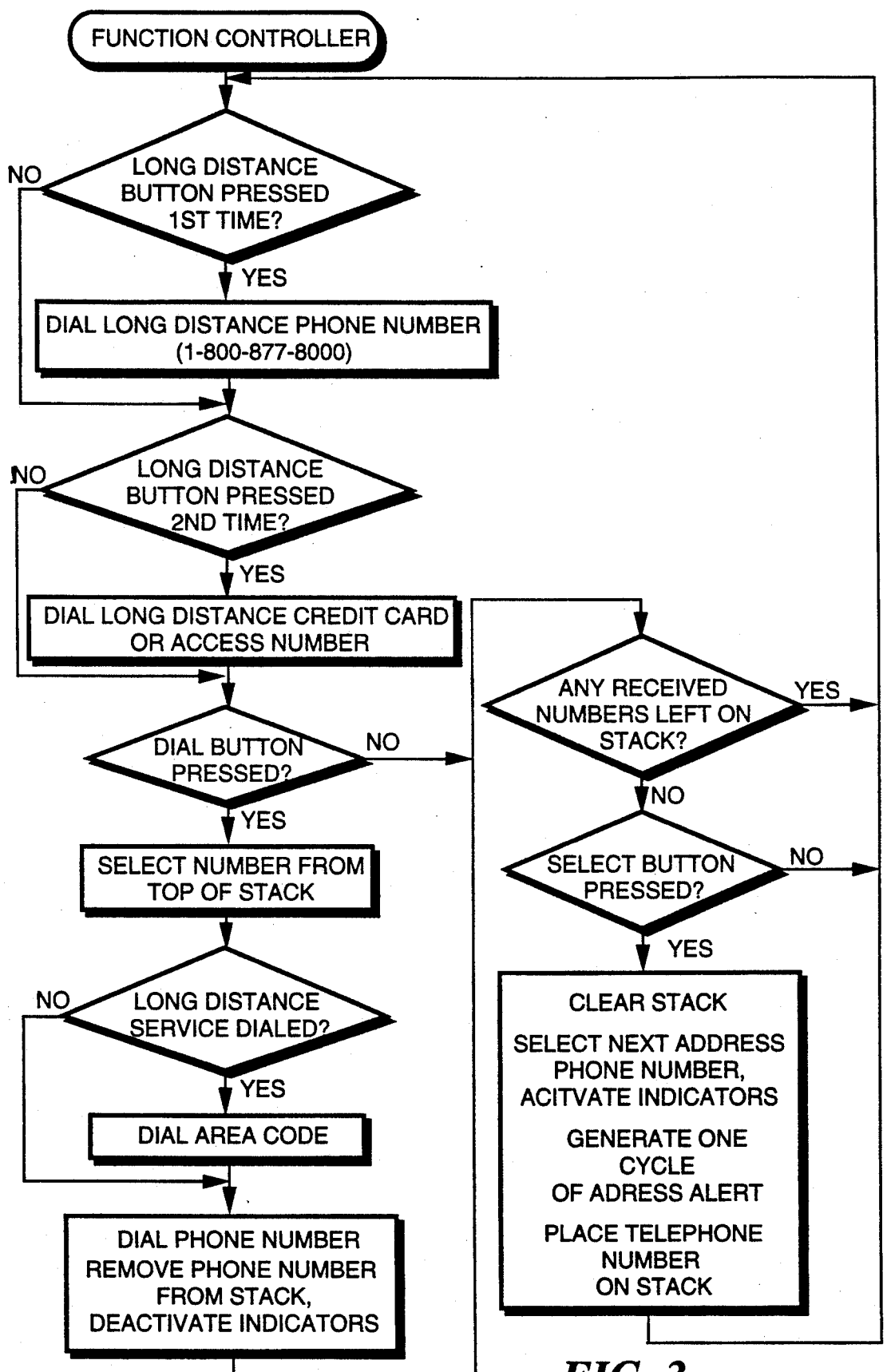
FIG. 3 is a flow chart illustrating various operator controlled functions of the pager of FIG. 1.

Referring specifically to FIG. 3, the process steps performed by controller 20 in response to inputs from the pager user are illustrated. In the first process step, controller 20 determines if the LONG DIST button on control panel 32 is pushed. If the LONG DIST button is pushed a first time, controller 20 retrieves the pager user's long distance service telephone number from memory 24 and signals DTMF generator 30 to generate appropriate dial tones. If the LONG DIST button is pushed a second time the pager user's long distance service access code is retrieved from memory 24 and controller 20 signals DTMF generator 30 to generate the appropriate dial tones. These steps can be eliminated if manual dialing is preferred, in which case the long distance service telephone number and long distance access number would be manually dialed before proceeding to the next step.

Controller 20 then determines if the DIAL button on panel 32 has been pushed. If the DIAL button has been pushed, controller 20 selects the telephone number at the top of the temporary memory stack. Controller 20 then determines if the long distance service was dialed, and if so causes DTMF generator 30 to generate appropriate dial tones to dial the area code of the long distance telephone number. If the long distance service was not dialed, controller 20 simply causes DTMF generator 30 to generate appropriate dial tones for dialing the telephone number. Once dialed, controller 20 removes the telephone number from the temporary memory stack and determines if there are any more numbers on the stack. If there is another number on the temporary memory stack, controller 20 begins the entire process again. Thus if several address were received before the user dialed the numbers with the pager, the telephone number corresponding to the newest address received would be dialed first, the process would continue to the next oldest address until all telephone numbers were dialed. Thus the telephone number to be dialed is selected by the pager to be dependent upon the address received by the pager.

It can be appreciated that the aforementioned steps may be modified to accommodate steps required to access long distance services having a different sequence of steps for completing a telephone connection. Furthermore, the steps can be modified to automatically complete the entire long distance service dialing with a single press of a button such as the long distance button. In this embodiment, pressing the DIAL button could dial the local number and pressing the LONG DIST button could automatically dial the long distance service, telephone number and access code with appropriate delays. Furthermore, in another embodiment, the number may be removed from the stack only after a predetermined delay, thereby permitting the number to be redialed if a first dialing attempt were unsuccessful.

If no more numbers are in the temporary memory stack, controller 20 determines whether the SELECT button on control panel 32 has been pushed. If the SELECT button has not been pushed, controller 20 simply waits for the LONG DIST button or the DIAL button to be pushed. Pushing SELECT button corresponds to the user manually selecting a telephone number to be dialed by the pager. Upon pressing the select button, the stack is cleared of any previously selected telephone number. An address next in sequence from a prior select button operation is selected. A cycle of the alert indicative of the selected address is generated, thereby indicating to the user which telephone number has been selected. The telephone number is then placed on the stack. This selected telephone number may then be dialed by pressing the DIAL or LONG DIST and DIAL buttons as previously described. If the selected number is a long distance number, long distance number detector 22 causes long distance indicator 26 to illuminate.

Thus, with some additional hardware and software a tone only pager is capable of receiving and automatically dialing a variety of telephone numbers. In general (unless a new telephone number is transmitted), the transmitted pages are simplified because only an address need be included in the signal. This simplifies transmissions, saves valuable air time and reduces system complexity and cost. If desired, memory 24 (the code plug) can be tailored to the specific needs of the pager users. Also, some of the features such as adding new numbers can be eliminated to further simplify the pager. While a complete long distance dialing system has been described, it will be understood that numbers such as the long distance service number and long distance access number could be dialed manually to further simplify the software and the memory. However, even with all of the described features the telephone dialing tone only pager is much less complicated and expensive than the telephone dialing display pager. The problems of selecting which telephone number to be dialed and the user dialing a long distance telephone number without knowing it is long distance have also been solved. The selection process is made without the requirement of a display and the reading thereof, thereby providing for pager users with impaired vision. Alternately, the aforementioned tone only functions may be incorporated into a display pager thereby providing a pager with even greater utility.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. A pager for receiving radio frequency (RF) paging signals broadcast from a paging system comprising:
   receiving means for receiving the RF paging signals and for demodulating the RF paging signals to recover a message signal, the message signal including a predetermined address;
   decoding means for decoding the predetermined address from within the message signal;
   memory means for storing a plurality of predetermined telephone numbers;
   address-to-telephone number conversion means for selecting a telephone number from the plurality of predetermined telephone numbers in response to the predetermined address; and
   signal generating means for converting the selected telephone number into a signal for dialing a telephone.

2. The pager according to claim 1 wherein said signal generating means comprises DTMF signal generating means for generating a DTMF signal in response to said selected telephone number for dialing said telephone.

3. The pager according to claim 2 wherein said DTMF signal generating means including an annunciating means for generating an audio DTMF signal.

4. The pager according to claim 1 wherein said memory means includes a reprogrammable memory device.

5. The pager according to claim 1 wherein:
   said decoding means further decodes a telephone number associated with the predetermined address within the message signal, and
   said conversion means selects the received telephone number in place of the telephone number stored within said memory means.

6. A selective call receiver comprising:
   receiving means for receiving a message signal including a predetermined address;
   decoding means for decoding the predetermined address from within the message signal;
   memory means for storing a plurality of predetermined telephone numbers;
   address-to-telephone number conversion means for selecting a telephone number from the plurality of predetermined telephone numbers in response to the predetermined address;
   means for detecting whether said selected telephone number is a long distance telephone number;
   signal generating means for converting the selected telephone number into a signal for dialing a telephone; and
   long distance alert means for producing a signal indicating that said selected telephone number is a long distance telephone number.

7. A selective call receiver comprising:
   receiving means for receiving a message signal including a predetermined address;
   decoding means for decoding the predetermined address from within the message signal;
   memory means for storing a plurality of predetermined telephone numbers;
   manual selecting means coupled to said memory means for manually selecting one of the plurality of predetermined telephone numbers;
   address-to-telephone number conversion means for automatically selecting a telephone number from the plurality of predetermined telephone numbers in response to the predetermined address;

signal generating means for converting the selected telephone number into a signal for dialing a telephone; and alert generating means for generating one of a plurality of audio alert signals indicative of the predetermined address in response to the reception of the predetermined address and for generating said one of said plurality of audio alert signals in response to the manual selection of said one of the plurality of predetermined telephone numbers corresponding to the predetermined address by said manual selecting means.

8. A selective call receiver comprising:

receiving means for receiving a message signal including a predetermined address;

decoding means for decoding the predetermined address from within the message signal;

memory means for storing a plurality of predetermined telephone numbers;

address-to-telephone number conversion means for selecting a telephone number from the plurality of predetermined telephone numbers in response to the predetermined address, wherein the selected telephone number includes a local portion and a long distance portion;

manual selecting means for manually selecting one of the plurality of predetermined telephone numbers; and signal generating means for converting the selected telephone number into a signal for dialing a telephone, wherein said signal generating means generates a signal having both the local portion and the long distance portion in response to the manual selection of a first predetermined telephone number and generates only the local portion in response to the absence of the manual selection of the first predetermined telephone number.

9. In conjunction with a selective call receiver having a memory having stored therein a telephone number associated with a predetermined address, a method of automatically dialing the telephone number comprising the steps of:

receiving a paging signal including the predetermined address;

retrieving the telephone number from the memory in response to the address; and generating a DTMF signal for dialing the telephone number.

10. The method according to claim 9 wherein the memory has a plurality of telephone numbers corresponding to a plurality of predetermined addresses stored therein, and wherein the step of retrieving includes selecting one of the plurality of telephone numbers corresponding to the predetermined address.

11. The method according to claim 9 wherein the paging signal further comprises a telephone number signal associated with the predetermined address, and wherein the step of receiving includes the step of storing the telephone number signal in the memory.

12. The method according to claim 10 further comprising the steps of:

determining whether the selected telephone number is a long distance telephone number; and activating a long distance indicator in response to the selected telephone number being a long distance telephone number.

13. The method according to claim 12 wherein the step of determining if the selected telephone number is a long distance telephone number comprises the step of counting the digits of the selected telephone number.

14. A method of dialing a telephone number by an automatic telephone dialer comprising the steps of:

(a) selecting a telephone number from a plurality of predetermined telephone numbers;

(b) generating a dialing signal for dialing the selected telephone number; and (c) generating one of a plurality of predetermined audio alert signals, said one of said plurality of predetermined audio alert signals unique to the selected telephone number and comprising audio tones different from said dialing signal.

15. The method according to claim 14 wherein the selected telephone number comprises a local portion and optionally comprises a long distance portion, the method further comprising the steps of:

(d) determining the presence of the long distance portion; and (e) generating a long distance signal indicative of the presence of the long distance portion in response to said determination.

16. The method of claim 15 wherein the step (d) of determining comprises the steps of:

determining the number of digits in the selected telephone number; and determining the presence of the long distance portion if the number of digits exceeds a predetermined number of digits.

17. The method according to claim 14 wherein the selected telephone number includes a local portion and a long distance portion and the method further includes after step (a) the step of:

optionally dialing a predetermined number; and wherein step (b) of generating includes the steps of:

generating a dialing signal for dialing the local portion of the selected telephone number if the predetermined number is not optionally dialed; and generating a dialing signal for dialing the long distance and local portions of the selected telephone number if the predetermined number is optionally dialed.

18. The method according to claim 16 wherein the predetermined number is seven.

* * * * *